No. 640,770. Patented Jan. 9, 1900.
J. C. HOWELL.
FRICTION GEARING.
(Application filed Aug. 18, 1899.)
(No Model.)
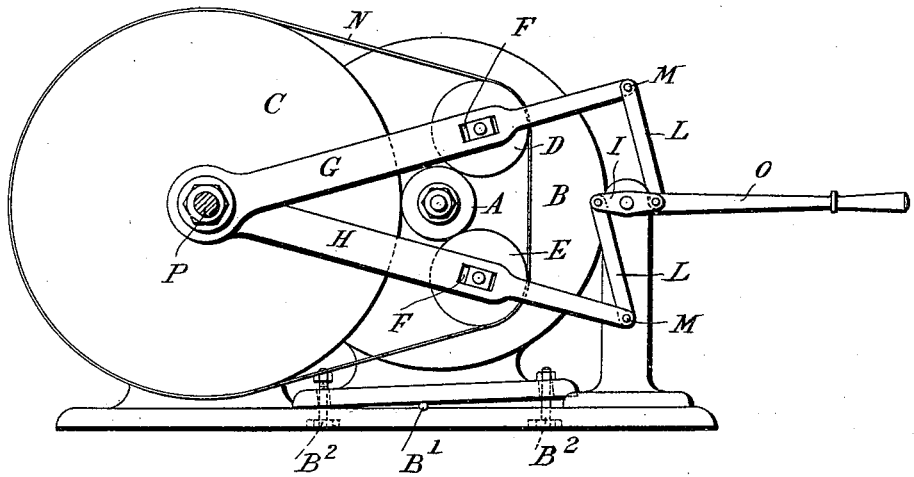
WITNESSES. INVENTOR.
John Charles Howell
By Foster Freeman
Attorneys
THE NORRIS PETERS CO., PHOTO-LITHO., WASHINGTON, D. C.

UNITED STATES PATENT OFFICE.

JOHN CHARLES HOWELL, OF LONDON, ENGLAND.

FRICTION-GEARING.

SPECIFICATION forming part of Letters Patent No. 640,770, dated January 9, 1900.

Application filed August 18, 1899. Serial No. 727,678. (No model.)

*To all whom it may concern:*

Be it known that I, JOHN CHARLES HOWELL, a subject of the Queen of Great Britain, residing at London, England, have invented a certain new and useful Improvement in Friction-Gearing, of which the following is a specification.

For the purpose of equalizing or balancing the strains on the journals of friction-gear it has heretofore been proposed to have the driving and driven wheel brought into contact and held together by a third wheel movable in or with its frame. With this construction it has also generally been proposed to use a surrounding band or belt traveling over the two outer wheels and tending to take some of the strain.

According to the present invention it is proposed that the gear shall consist of four wheels instead of three, as in the old system; and to this end I employ a set of three wheels, whose peripheries can be brought in contact with the periphery of a wheel located in a central position between them, so that the angular forces acting on the points of contact of the three outer wheels with the inner wheel tend to relieve the inner wheel-journals from all stress, and to counteract the opposing stresses set up on the journals of the outer wheels I surround the three wheels with a flexible band or the like whose length is adjusted so that when the wheels are in gear, as described, the belt is at or near its working tension. One apparatus by which I attain this object is shown in the accompanying drawing, which is an elevation of such apparatus.

In the drawing, A represents the central wheel, mounted on a spindle, say, of an electric or other motor B. The motor is capable of a slight movement on a pivoting-point B', such small movement of oscillation being arranged to normally remove the pulley A from the wheel C when the gear is at rest. When the form of pivoting shown is used, the motor may be kept from lateral movement by bolts B², which are arranged to allow of the vertical play. D and E are wheels the axles of which are fixed in bearings which are free to slide in the slots F F in the levers G H, such levers forming an adjustable angular frame which is pivoted upon the axle of the opposite outer wheel C. The two levers G and H can be made to approach or recede from each other by the movements of the pivoted lever I, acting by means of the connecting-rods L L, which are pivoted to it and to the levers G H at the points M M. A flexible band N is arranged, as shown, about the three outer wheels C, D, and E, the length of this band being such that when the outer wheels are in contact with the central wheel A its tension is at or near its maximum working strain. A lever O or other device can be attached to the axle of the lever I, which when turned in one direction will tend to increase the angle between the levers G and H, separating the wheels D E, and so permitting the central wheel to fall away from contact with the wheel C, while a movement in the other direction will decrease the angle between the levers, thus bringing the wheels D and E into contact with the central wheel A and forcing it into contact with the wheel C. Therefore in the present case as wheel A is made the driver wheel C will be driven, or if wheel C be driver then wheel A will be driven. It is of course obvious that either wheel D or E could be made the driver if necessary. In the case shown the power would be taken from off the shaft P of wheel C.

Several other methods can be used for bringing the wheels D and E into contact with the wheel A and forcing it against the wheel C, and various other mechanical devices can also be utilized for causing the angular adjustment levers to be closed or opened, as my invention is not limited to the arrangement of parts employed for this purpose, which I have described and illustrated.

What I claim is—

1. In friction-gearing and in combination, an inner and an outer wheel, means for mounting one of same so that it is normally separated from the other, friction-wheels outside the inner wheel adapted to bear on the latter wheel and to bring it and the first outer wheel together, means for carrying said friction-wheels and altering their position with respect to each other, and a flexible band surrounding the adjustable friction-wheels and the outer wheel so as to counteract the pressure in the opposite direction on said wheels substantially as described.

2. In friction-gearing the combination with an inner and an outer wheel so mounted as to be normally separated, of friction-wheels outside the inner wheel adapted to bear on said wheel and to bring it and the first outer wheel together, levers carrying said friction-wheels, means for allowing such wheels play in the levers, said levers having their pivot-points on the axis of the first outer wheel and means for moving the levers and friction-wheels together and apart, and a band surrounding the friction-wheels and the first outer wheel so as to counteract the pressure in the opposite direction on said wheels substantially as described.

In testimony whereof I have hereunto set my hand in the presence of two subscribing witnesses.

JOHN CHARLES HOWELL.

Witnesses:
PHILIP M. JUSTICE,
ALLEN PARRY JONES.